(12) United States Patent
Richter et al.

(10) Patent No.: US 9,251,481 B2
(45) Date of Patent: Feb. 2, 2016

(54) DISTRIBUTED METERING AND MONITORING SYSTEM

(75) Inventors: Owen E. Richter, Santa Clara, CA (US); Lukas M. Lundell, Chicago, IL (US); Charles Michael Portell, Chicago, IL (US); Bryan M. Walker, San Jose, CA (US); Sonali Parthasarathy, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 380 days.

(21) Appl. No.: 13/159,042

(22) Filed: Jun. 13, 2011

(65) Prior Publication Data
US 2012/0317274 A1 Dec. 13, 2012

(51) Int. Cl.
| | | |
|---|---|---|
| G06F 15/177 | (2006.01) | |
| G06F 15/173 | (2006.01) | |
| G06Q 10/06 | (2012.01) | |
| G06F 9/50 | (2006.01) | |
| G06F 11/34 | (2006.01) | |

(52) U.S. Cl.
CPC ............... *G06Q 10/06* (2013.01); *G06F 9/5061* (2013.01); *G06F 11/3495* (2013.01); *G06F 2201/815* (2013.01); *G06F 2209/505* (2013.01)

(58) Field of Classification Search
CPC ............ G06F 9/45558; G06F 11/3495; G06F 2201/815; H04L 41/0813; H04L 43/08
USPC .................................................. 709/220–224
See application file for complete search history.

(56) References Cited

U.S. PATENT DOCUMENTS

| | | | | |
|---|---|---|---|---|
| 7,702,779 B1 * | 4/2010 | Gupta et al. | .................. | 709/224 |
| 8,321,558 B1 * | 11/2012 | Sirota et al. | .................. | 709/224 |
| 8,364,820 B2 * | 1/2013 | Madani | ................ | G06F 9/5061 |
| | | | | 709/223 |
| 8,458,717 B1 * | 6/2013 | Keagy et al. | .................. | 718/104 |
| 2002/0052962 A1 * | 5/2002 | Cherkasova | ........ | H04L 41/5019 |
| | | | | 709/229 |
| 2003/0014507 A1 * | 1/2003 | Bertram et al. | ............... | 709/223 |
| 2005/0091396 A1 * | 4/2005 | Nilakantan et al. | ........... | 709/232 |
| 2005/0246525 A1 * | 11/2005 | Bade et al. | .................... | 713/164 |
| 2008/0004927 A1 | 1/2008 | Haller et al. | | |
| 2009/0271786 A1 | 10/2009 | Groth | | |

(Continued)

FOREIGN PATENT DOCUMENTS

EP    2461144 A2    6/2012

OTHER PUBLICATIONS

Extended European Search Report issued in corresponding European Patent Application No. 12171693.0, mailed Oct. 25, 2012, 6 pages.

*Primary Examiner* — Joshua Joo
(74) *Attorney, Agent, or Firm* — Brinks Gilson & Lione

(57) ABSTRACT

The distributed metering and monitoring service (DMMS) system provides a way to gather and maintain metrics data which remains distributed, until requested. The DMMS system uses messaging queues to scale the number of servers that may be monitored and metered to a hyperscale of greater than 10,000 servers. The DMMS system determines how many servers (nodes) to assign to a cluster, and uses a metric aggregator to collect and store metrics data for the nodes. The DMMS system creates message queues for the instances, injects instance identifiers into the cluster state data and metrics data, listens for request messages for metering information for instances, retrieves the metrics data for users identified by the instance identifiers stored locally at the nodes, and calculates the metering information for the instance.

29 Claims, 9 Drawing Sheets

(56) References Cited

U.S. PATENT DOCUMENTS

| | | |
|---|---|---|
| 2009/0319905 A1 | 12/2009 | Loeb et al. |
| 2010/0057867 A1* | 3/2010 | Yue et al. ............. 709/206 |
| 2010/0211946 A1* | 8/2010 | Elzur ............... 718/1 |
| 2010/0274890 A1* | 10/2010 | Patel et al. ............ 709/224 |
| 2010/0332629 A1 | 12/2010 | Cotugno et al. |
| 2011/0113136 A1 | 5/2011 | Phaal |
| 2011/0296024 A1* | 12/2011 | Madani ............ G06F 9/5061 709/226 |
| 2012/0054265 A1* | 3/2012 | Kazerani et al. ......... 709/203 |
| 2012/0065789 A1 | 3/2012 | Scelzi et al. |
| 2012/0101968 A1* | 4/2012 | Banerjee et al. ......... 706/21 |
| 2012/0311571 A1* | 12/2012 | Morgan ............ 718/1 |
| 2013/0227091 A1* | 8/2013 | Tompkins ......... G06F 9/45558 709/220 |
| 2014/0237472 A1* | 8/2014 | Adogla ........... G06F 9/5077 718/1 |
| 2015/0007180 A1* | 1/2015 | Sharp ............ G06F 9/45558 718/1 |

* cited by examiner

DISTRIBUTED METERING AND MONITORING SYSTEM

1. TECHNICAL FIELD

The present description relates generally to a system and method, to monitor and meter networked resources, and more particularly, but not exclusively, to maintaining metrics data distributed to the network cluster until requested, and using messaging queues to scale the number of servers per networked environment that may be monitored and metered to the hyperscale of greater than 10,000 nodes.

2. BACKGROUND

Many industry approaches to metering and billing information include continuously aggregating metrics for the nodes of a networked environment into a central repository. Current solutions configure servers with agents and those agents provide information through the network to be stored in a single database. Large proprietary software and internet companies are cornering the enterprise virtualization and cloud computing market and require a low cost, elastic and efficient enterprise data center stack to monitor and meter networked environments at the hyperscale that is currently emerging. In an embodiment, hyperscale computing may refer to systems composed of greater than 10,000 servers (nodes). Current methods for monitoring virtual machine instances that include installing software on each virtual machine instance to monitor the instance are impractical to use at the hyperscale of networked environments today. Current metering and monitoring solutions that employ a centralized repository to collect metrics data do not scale well, because the upper limit of the number of nodes that may be monitored depends on multiple factors including the number of nodes monitored, the metrics data to be collected, and the intended frequency to perform the data collection. Monitoring is about resource utilization, so that from a system administrator perspective monitoring typically includes making sure that system resources are not over tasked. Metering is about which users are using which resources, and less about which resources are being used and are those resources being overloaded. As service providers, such as those in the information and energy industries, identify new markets, products, and services, the ability to accurately monitor and meter at the hyperscale of networked devices used to deliver the products and services is necessary.

SUMMARY

A distributed metering and monitoring service (DMMS) system provides a way to scale the number of nodes (servers) monitored and metered to the hyperscale of greater than 10,000 servers, by maintaining metrics data distributed to clusters until requested, and using messaging queues to maintain state information and metrics data in the messaging layer of the DMMS system. The DMMS system provides a user aggregate access to data without aggregating the data requested until the data is requested. The DMMS system includes a DMMS memory coupled to a DMMS processor, and the DMMS memory includes messaging queue logic to receive and route request messages for metering information, and receive and route reply messages to return the locally retrieved metering information. The DMMS system determines the number of nodes networked to assign to a cluster and respective messaging queue. Each node includes instances responsive to respective user interactions through a user interface. The DMMS system collects metrics data for the nodes, including the virtual machine instances on the nodes. The DMMS system communicates through the messaging system to request retrieval of metrics data identified in a request message e.g., the instances assigned the node) by the user identifiers and/or instances identifiers.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
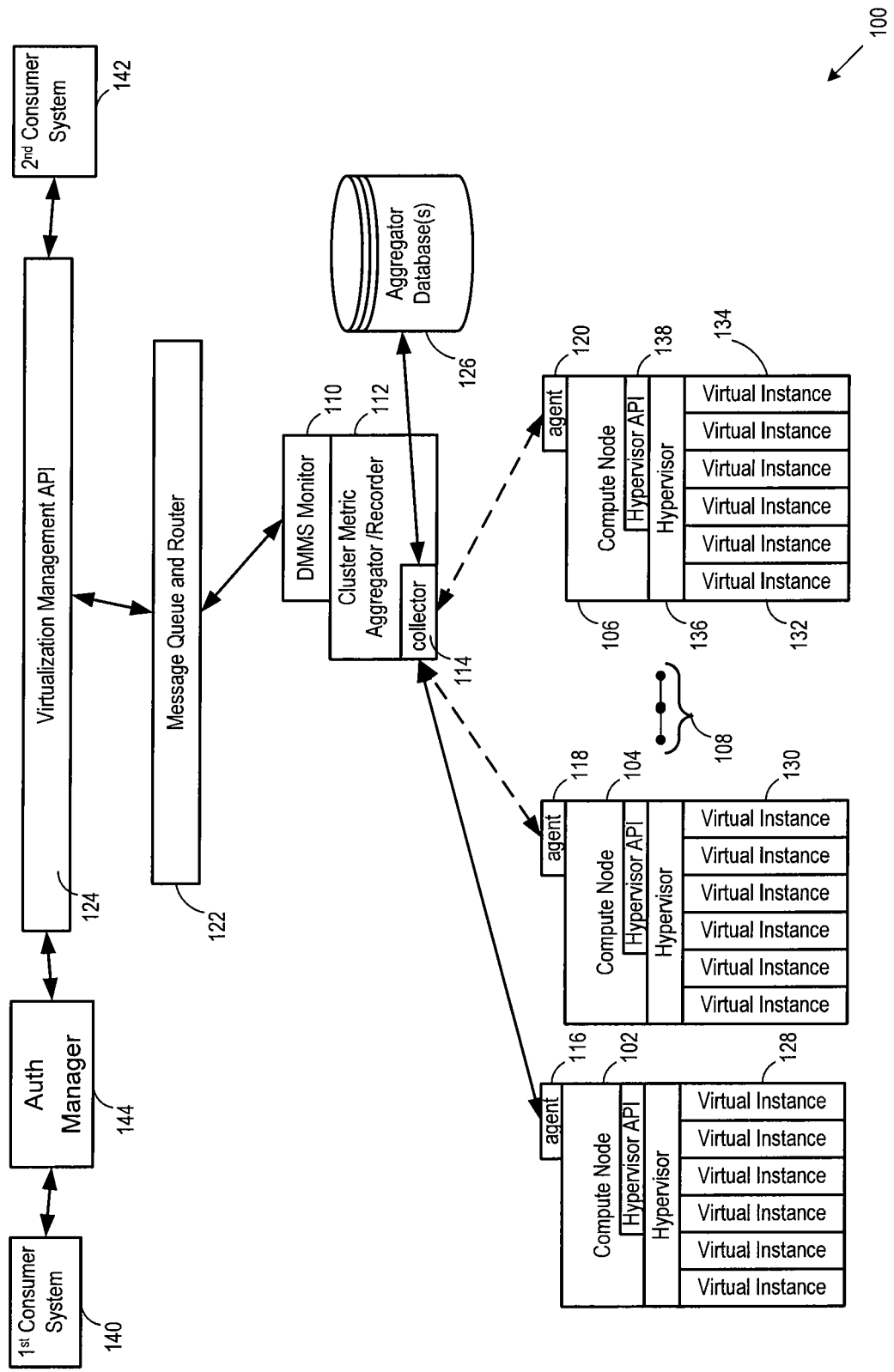
FIG. 1 is a block diagram of a generalized distributed metering and monitoring service (DMMS) system configuration.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Large proprietary software and internet companies are cornering the enterprise virtualization and cloud computing market. The DMMS system enables enterprises to build a lower cost, elastic and efficient enterprise data center stack. Many solutions for metering users in a networked environment scale well to a certain level, but not to the hyperscale that is currently emerging (e.g., >10,000 servers or nodes to monitor/meter per networked environment). The DMMS system configuration implements a purpose built overlay network built to use an instance identifier, and/or user information to route messages. The DMMS system provides a novel approach for metering and billing in a hyperscale networked environment which allows for the collection and storage of metrics data to stay distributed. The DMMS system allows a user to aggregate access to data without aggregating the data requested until the data is requested. In contrast to other industry approaches, the DMMS system does not require that the metering and billing information be continuously aggregated in a central repository. The DMMS system metering and billing information stays distributed in each cluster of a compute system until requested. The DMMS system allows for specific user (e.g., instance) information to be requested by the end-user or a billing system of a networked environment (e.g., a cloud computing environment and/or an electric power grid environment) and then the request is routed to the node where the instance information is stored, and then the request is processed. In an embodiment, the DMMS architecture may utilize open source Software™ to obtain system wide metrics pertaining to all levels of infrastructure contained in a networked environment. In addition to computing clusters, the DMMS system may be used in an electric power grid environment, as an example, to monitor and meter appliances used by customers of energy providers, and provide energy providers and consumers the ability to bill/be billed at the granularity of the appliance (e.g., any device or process networked and/or connected to the electric grid). The DMMS system utilizes features in standardization of message queuing (AMQP) to allow components of the system to cooperate in a distributed environment. The message queuing system allows The DMMS system to keep metering information locally at the node level. The DMMS system may be implanted using extremely scalable components, including, for example, the Open Source RabbitMQ™ Broker and the Ganglia™ monitoring system, and allows the DMMS system to scale according to the ability of the RabbitMQ™ broker, for example, by storing the systems state information within the clusters of the system, and coordinating collection of the information through the network/messaging component of the system. The DMMS system allows for simpler integration with a billing system, (e.g., a consuming system requesting instance and user metering information) so that a service provider (e.g., a cloud operator and/or an electrical energy provider) may bill users according to metering data at various levels of granularity.

In an embodiment, the DMMS architecture creates an Open Source IaaS "Private Cloud" powered by Eucalyptus™/OpenStack™ and KVM/QEMU that scales the Open Source IaaS "Private Cloud" to a production environment that can support several hundred virtual machines. The DMMS architecture integrates with Open Source ITSM™ software, proprietary virtualization tools, and public and/or internet-based clouds. Eucalyptus™ is an open-source software platform that implements IaaS-style cloud computing using the existing Linux-based infrastructure found in the modern data center. OpenStack™ is a collection of open source technologies that deliver a scalable cloud operating system. The QEMU/KVM hypervisor interface is a libvirt QEMU driver that manages QEMU emulators, and also manages KVM, which provides the QEMU command line syntax and monitors interaction. The libvirt QEMU driver is a multi-instance driver, providing a single system wide privileged driver (the "system" instance), and per-user unprivileged drivers (the "session" instance), and the URI driver protocol is "qemu".

Table 1 shows example connection URIs for the libvirt driver. Accessing the QEMU driver in libvirt, the "qemu:///session" family of URIs connect to a libvirtd instance running as the same user/group ID as the client application. The QEMU instances spawned from the driver share the same privileges as the client application. The intended use case for the driver is desktop virtualization, with virtual machines storing their disk images in the user's home directory and being managed from the local desktop login session. The "qemu:///system" family of URIs connect to a libvirtd instance running as the privileged system account 'root'. The QEMU instances spawned from the driver may have much higher privileges than the client application managing them. The intended use case for the driver is server virtualization, where the virtual machines may need to be connected to host resources (e.g., block, PCI, USB, and network devices) whose access requires elevated privileges.

TABLE 1

Example Connection URIs for the libvirt driver

| | |
|---|---|
| qemu:///session | (local access to per-user instance) |
| qemu+unix:///session | (local access to per-user instance) |
| qemu:///system | (local access to system instance) |
| qemu+unix:///system | (local access to system instance) |
| qemu://example.com/system | (remote access, TLS/x509) |
| qemu+tcp://example.com/system | (remote access, SASI/Kerberos) |
| qemu+ssh://root@example.com/system | (remote access, SSH tunnelled) |

The DMMS system collects physical host performance metrics, as well as virtual machine metrics, and evaluates the metrics according to the DMMS cost model (e.g., for billing purposes). The DMMS system may receive a cost breakdown policy from a billing system to incorporate and/or use to identify which physical host performance metrics, as well as virtual metrics, to collect and evaluate. The infrastructure metering component collects usage statistics to track consumption overall and by user (instance). The DMMS system polls the metrics on a configurable interval from the underlying infrastructure layers. DMMS usage records and data collected may include date and time of usage occurrence, customer identifying information, quantity consumed, and consumption description. The DMMS system records the collected metrics throughout the month (e.g., reporting period and/or billing period) and dependent on the chosen pricing model, aggregated to reflect that periods billing, and/or any other configurable collection frequency. Metric collection occurs on both the hypervisor (e.g., instances) and client machine levels (e.g., nodes). The DMMS system pulls the metrics to provide usage analysis broken down by user, group, and overall. The DMMS system analyzes the aggregated set of data according to the DMMS cost model (e.g., the DMMS system uses the DMMS cost model to identify metrics of particular interest). The DMMS system may use another cost model provided by a billing system, information consuming system, or some other source to translate and/or associate the metrics collected from the nodes to the associated costs for user-to-instance metering information. The billing policy may be a variable policy set with a client (e.g., a billing system). The DMMS system may itemize invoice reports according to the charges incurred during the billing cycle. The invoices may include both scheduled runs and ad-hoc generating methods. The DMMS system provides a user interface for the user to make adjustments to invoices, incorporate credits, debits, and line item adjustments.

The DMMS system allows for specific user (e.g., instance) information to be requested by an end-user or a billing system of a networked environment (e.g., a cloud computing environment and/or an electric power grid environment), routed to where the information is stored, and then processed. The DMMS system may be used to monitor and meter appliances used by customers of energy providers, and provide users the ability to be billed at the granularity of the appliance (e.g., any device networked and/or connected to the electric grid).

Table 2 is a list of metrics that the DMMS system may collect from the networked environment. The DMMS system may collect the metrics data listed in Table 2 in order to calculate the general usage of the environment and in particular each user-instance usage.

TABLE 2

Example list of Metrics

| Metric Category | Metric |
|---|---|
| Compute - CPU | CPU Speed |
| Compute - CPU | CPU Utilization |
| Compute - CPU | Number of virtual cores |
| Compute - OS | OS version |
| Compute - OS | OS 32-bit vs. 64-bit |
| Compute - RAM | Memory total |
| Compute - RAM | Memory utilization |
| Compute - Hard Disk | Total hard disk size |
| Compute - Hard Disk | Maximum disk space used |
| Compute - Running Times | Instance start and stop times |
| Compute - State | Instance state |
| Network | Type of HTTP requests sent |
| Network | Number of HTTP requests |
| Network | Total data transfer (in/out) |
| Network | Total packets sent (in/out) |
| Network | Destination/Source IP Addresses |
| Network | Total Network Data Transfer (in/out) |
| Storage | Size of storage buckets/files/directories |
| Storage | Size of Block Storage Volumes |
| Process | Metrics on individual processes |
| Custom | Individual user activity |
| Custom | Instance Cluster/Network Name |

Table 3 shows user selectable metrics to schedule for collection in the networked environment depending on the usage requirements established by the end user. The DMMS system may collect the user selectable metrics by default, but the DMMS system may not report the user selectable metrics unless specifically requested or indicated, and/or configured to do so.

TABLE 3

Example user selectable metrics to schedule for collection

| Category | Metric | Description |
|---|---|---|
| Data Structures | Machine Type | Processor Family |
| Data Structures | OS Name | Operating System |
| Host Description | Hostname | Hostname |
| Host Description | UUID | 16 byte binary UUID |
| Host Description | OS Release | |
| Host Description | IP Address | |
| Physical Server Performance | Proc_run | Total number processes running |
| Physical Server Performance | Proc_total | Total number processes |
| Physical Server Performance | Cpu_speed | Speed in mHz of CPUs |
| Physical Server Performance | Cpu_num | Number of CPUs |
| Physical Server Performance | Uptime | Seconds since last reboot |
| Physical Server Performance | Cpu_user | User time (ms) |
| Physical Server Performance | Cpu_system | System time (ms) |
| Physical Server Performance | Cpu_wio | Time waiting for I/O to complete (ms) |
| Physical Server Performance | Cpu_idle | Idle time (ms) |
| Physical Server Memory | Mem_total | Total bytes |
| Physical Server Memory | Mem_free | Free bytes |
| Physical Server Memory | Mem_shared | Shared bytes |
| Physical Server Memory | Page_in | Pages in count |
| Physical Server Memory | Page_out | Pages out count |
| Physical Server Disk I/O | Disk_total | Total disk size in bytes |
| Physical Server Disk I/O | Disk_free | Total disk free in bytes |
| Physical Server Disk I/O | Part_max_used | Utilization of most utilized partition |
| Physical Server Disk I/O | Reads | Reads Issued |
| Physical Server Disk I/O | Bytes_read | Bytes read |
| Physical Server Disk I/O | Writes | Writes completed |
| Physical Server Disk I/O | Bytes_written | Bytes written |
| Physical Server Network I/O | Bytes_in | Total bytes in |
| Physical Server Network I/O | Pkts_in | Total packets in |
| Physical Server Network I/O | Bytes_out | Total bytes out |
| Physical Server Network I/O | Pkts_out | Total packets out |
| Virtual Node Statistics | CPUs | Number of active CPUs |
| Virtual Node Statistics | memory | Memory size in bytes |
| Virtual Node Statistics | Memory_free | Unassigned memory in bytes |
| Virtual Node Statistics | Num_domains | Number of active domains |
| Virtual Domain CPU statistics | State | Virtual Domain State |
| Virtual Domain CPU Statistics | cpuTime | CPU time used (ms) |
| Virtual Domain CPU Statistics | nrVirtCPU | Number of virtual CPUs for the domain |
| Virtual Domain Memory Statistics | memory | Memory in bytes used by domain |
| Virtual Domain Memory Statistics | maxMemory | Total memory allowed in bytes |

TABLE 3-continued

Example user selectable metrics to schedule for collection

| Category | Metric | Description |
|---|---|---|
| Virtual Domain Disk Statistics | Allocation | Current allocation in bytes |
| Virtual Domain Disk Statistics | Available | Remaining free bytes |
| Virtual Domain Disk Statistics | Red_req | Number of read requests |
| Virtual Domain Disk Statistics | Rd_bytes | Number of read bytes |
| Virtual Domain Disk Statistics | Wr_Req | Number of write requests |
| Virtual Domain Disk Statistics | Wr_bytes | Number of written bytes |
| Virtual Domain Network Statistics | Rx_bytes | Total bytes received |

FIG. 1 is a block diagram 100 of a generalized distributed metering and monitoring service (DMMS) system configuration. FIG. 1 shows a cluster of compute hosts (nodes 102, 104, 106, 108) with a local image of a DMMS monitor 110, and a cluster metric aggregator/recorder 112 that includes a metric data collector 114. Each node (102, 104, 106, 108) includes the aggregator component (agent 116, 118, 120) to collect metering information for the nodes (102, 104, 106, 108). The 'cluster metric aggregator/recorder' 112 monitors the state of a cluster of nodes, and nodes of the cluster, and includes a performance capacity to limit the number of nodes monitored by a cluster. An acceptable size of a cluster may be based on many factors including the number of metrics to collect, the time interval or frequency of collection, speed/power of the metric aggregator 112, and geographic considerations. The DMMS logic assigns the nodes (102, 104, 106, 108) to respective clusters, collects cluster state data that identifies the state of the cluster, and each of the nodes of a cluster. The cluster state data and metrics data may include time-series metrics data. The DMMS system configuration scales to support several hundred clusters supporting a few hundred nodes (e.g., 500 nodes—severs connected to each cluster) supported by a messaging system 122. The messaging system and routing design allow the user to scale a metering system more horizontally, and have several systems (e.g., nodes of a cluster) maintain the recorded metrics (e.g., each system being responsible for one cluster of hosts), rather than the alternative of trying to aggregate recorded metrics for a large number of clusters on a single system. Using a message queuing system allows the DMMS system to keep metering information locally and retrieve the metering information by sending a request message (e.g., a request for time-series metrics data or metering data for an instance). Each 'cluster metric aggregator/recorder' 112 may be associated with a messaging queue 122. The DMMS logic may determine the metrics data to collect in order to calculate the DMMS parameters. The nodes, and accordingly, the number of nodes assigned to a cluster may vary depending on the different performance capacity of the various nodes assigned to a particular cluster. Accordingly, the clusters may not be uniformly composed of the same number of nodes, but may depend on the aggregate performance of the various nodes assigned to the cluster.

The DMMS system configuration 100 uses message queues 120 for each instance to retrieve metering information for the instances. The DMMS monitor 110 listens for requests for information for any of the nodes for which the aggregator is collecting metrics data. The DMMS system includes a communications interface in communications with a virtual machine controller (VMC) system (124) (e.g., includes virtualization management application programming interface (API) logic) that maintains information regarding the link between the instances and users. Each instance identifies a user for whom the metering logic calculates the metering information, and the DMMS system uses instance identifiers as routing identifier to route request messages to retrieve metering information for users. The virtualization management API facilitates the request for metering information from the message queue 122, provides a way to connect to the message queue 122, and the message queue 122 then contacts the appropriate DMMS monitor 110 to retrieve the appropriate information (e.g., from the aggregator database 126, and/or node memory). The DMMS monitor 110 returns the appropriate information to the virtual machine control solution 124 and the message queue 122.

A cluster defines node identifiers for the nodes (102, 104, 106, 108) assigned to the cluster. The node memory includes metric aggregator logic (114) that stores the node identifiers for the nodes (102, 104, 106, 108) assigned to the cluster in the node memory, collects the cluster state data that identifies the state of the cluster (102), collects the metrics data for the node identifiers, and stores the cluster state data and metrics data in the node memory and/or a cluster aggregator database 126. The metric aggregator logic (112) monitors the nodes of a cluster and collects node level information while linking the respective instances (128, 130, 132, 134) of the nodes (102, 104, 106, 108) and the instance information to the node level information. Each node (102, 104, 106, 108) includes a memory coupled to a processor. The memory includes the cluster state data and the metrics data for the node identifiers. The state information of each node and the cluster may be communicated and propagated to each other node of the cluster by using a protocol (e.g., XER over XML, XML governed by XML Encoding Rules (XER), a canonical (called CXER and used, e.g., for digital signatures) and a non-canonical variant of the XML Encoding Rules). The memory also includes a hypervisor 136 that manages the instances (128, 130, 132, 134) that consume networked resources, and instance state information stored in the memory. The hypervisor 136 assigns an instance identifier that also identifies the assigned node by a node identifier. The node memory includes metering logic to retrieve instance state information from the hypervisor 136 (e.g., via a hypervisor API 138) for the instances identified by the instance identifiers, and generate a reply message that includes the metering information for the instances (128, 130, 132, 134) assigned the node. The DMMS logic may implement collector agent modules (116, 118, 120) which interact with the hypervisor API (138) to retrieve metric information from the virtual machines instances (128, 130, 132, 134) without installing software on the virtual machines (instances), and tags the metric information with the instance identifiers of the virtual machine. Consumer systems (140, 142) may access the DMMS system through the authorization manager 144 or directly if for example the consumer system 142 is a trusted system. The DMMS system may use the auth manager 144 for server-defined security (e.g., node access). The DMMS system allows the networked environment to scale at hyperscale by optimizing a message queue-to-cluster ratio of a networked environment of multiple nodes divided into multiple clusters (e.g., a message queue may be assigned cluster of nodes, where multiple clusters may be configured to monitor and meter thousands of nodes). In contrast to the configuration used by the DMMS system, installing software on each virtual machine (instance) imposes substantial overhead on the node, metrics data aggregator and network environment overall, and accordingly, does not scale anywhere near to the hyperscale of greater than 10,000 nodes.

Figure 2:
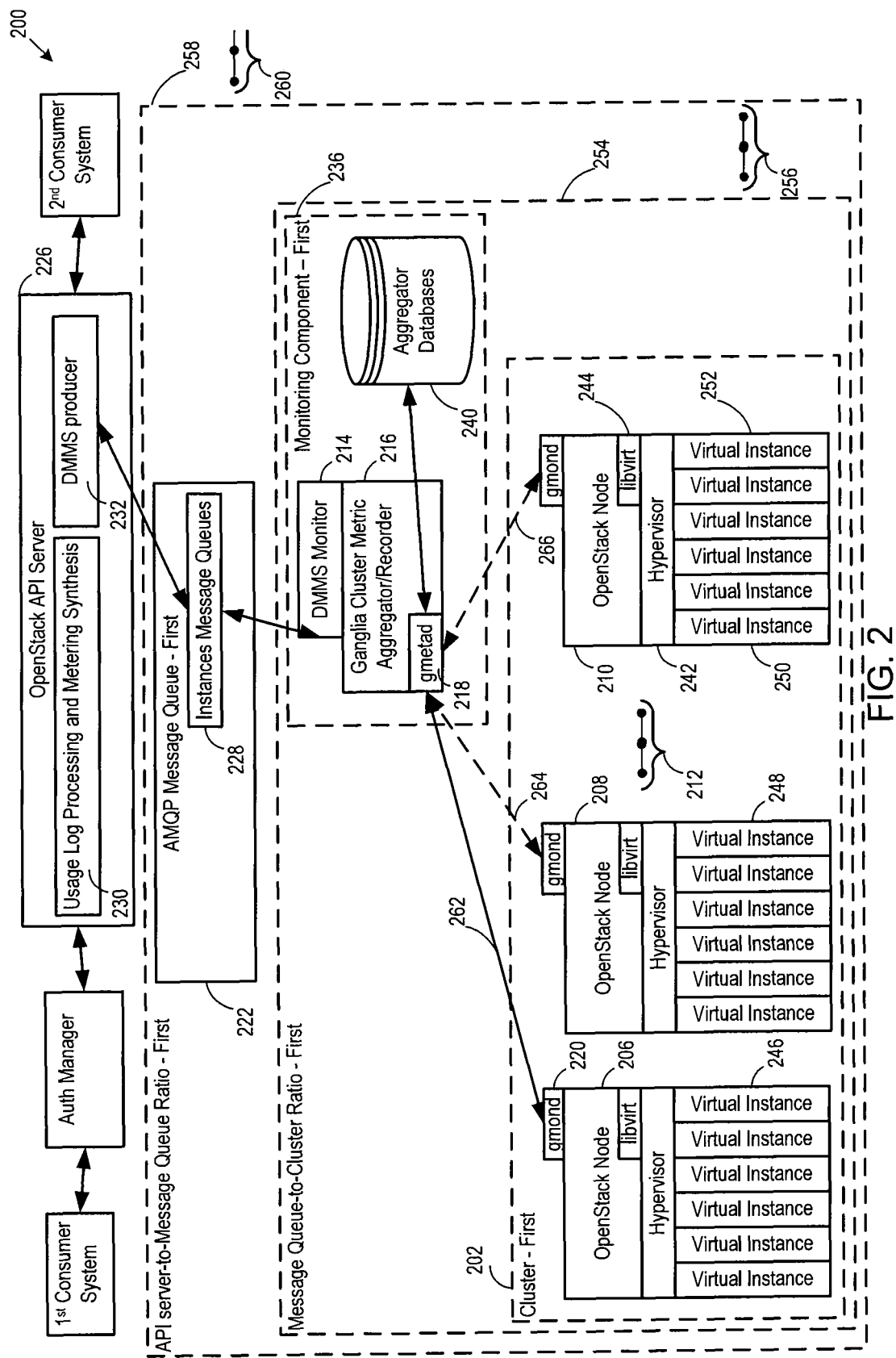
FIG. 2 is a block diagram of a distributed metering and monitoring service (DMMS) system configuration.

FIG. 2 is a block diagram 200 of a distributed metering and monitoring service (DMMS) system configuration. FIG. 2 shows a cluster-first 202 of multiple clusters (202) of compute hosts (nodes 206, 208, 210, 212), each node with a local image of a DMMS monitor 214, a 'Ganglia Metric Aggregator' 216 that includes a metric data collector (gmetad) 218, and a metric data agent (gmond) 220 stored in the memory of each of the nodes. Each node (206, 208, 210, 212) includes the aggregator component (gmond) 220 to collect metering information for the nodes (206, 208, 210, 212). The 'Ganglia Metric Aggregator' 216 monitors the state of a cluster of nodes, and nodes of the cluster, and includes a performance capacity to limit the number of nodes monitored by a cluster. An acceptable size of the clusters (202) may be based on many factors including the number of metrics to collect, the time interval or frequency of collection, speed/power of the ganglia metric aggregator 216, and geographic considerations. The DMMS logic assigns the nodes (206, 208, 210, 212) to respective clusters, collects cluster state data that identifies the state of the cluster, and each of the nodes of the respective cluster. The DMMS system configuration scales to support clusters supporting nodes supported by a messaging system 222. The configuration may be further extended by implementing multiple message systems (222) in communications and controlled by one or more virtual machine controller (VMC) system (e.g., OpenStack™) (226). The multiple message systems (222) may be configured with one or more processors and memories, in addition to the one or more processors and memories of the DMMS system.

The DMMS system configuration 200 uses message queues 228 for each instance to retrieve metering information for the instances. The DMMS monitor 214 listens for requests for information for any of the nodes for which the aggregator 216 is collecting metrics data. The DMMS system includes a communications interface in communications with a virtual machine controller (VMC) system (e.g., OpenStack™) (226) that maintains information regarding the link between the instances and users. Each instance identifies a user for whom the metering logic (e.g., the usage log processing and metering synthesis logic 230) calculates the metering information, and the DMMS system uses instance identifiers as routing identifier to route request messages to retrieve metering information for users. The DMMS system may implement the OpenStack™ 226 (or another virtual machine control solution) API integration that contains information regarding the link between virtual machine instance identifiers and user identifiers, and the API integration calls to the DMMS producer 232 to request metering information from the message queue 228. The DMMS producer 232 is a client that connects to the message queue 228, and the message queue 228 then contacts the appropriate DMMS monitoring component (236, and 238 not shown, replications of 236) to retrieve the appropriate information (e.g., from the aggregator database 240, and/or node memory). The DMMS monitor 214 returns the appropriate information to the virtual machine control solution (e.g., OpenStack™) 226, the DMMS producer 232, usage log processing and metering synthesis logic 230 (e.g., used to calculate a metering calculation), compute cluster (202), monitoring system (236, 238), and the message queue 228 of the appropriate messaging system (222).

Each cluster (202) defines node identifiers for each of the nodes (206, 208, 210, 212) assigned to the cluster (202). The hypervisor 242 assigns an instance identifier that also identifies the assigned node by a node identifier. The node memory includes retrieved instance state information from the hypervisor 242 (e.g., via libvrt driver 244) for the instances identified by the instance identifiers, and generated reply message that includes the metering information for the instances (246, 248, 250, 252) assigned the node. A node 206 (e.g., the processor of the node) of the cluster 202 may operate as a primary controller (as indicated by the dotted line with arrows 262) of the metrics aggregator 216 and monitoring component 236, while the other nodes (208, 210, 212) of the cluster (202) operate as backup and/or failover controllers (as indicated by the dotted lines with arrows 264, 266) for the metrics aggregator. The DMMS logic may implement Ganglia™ dynamic shared object (DSO) modules that interact with libvrt 240 to inject metric information from the virtual machines instances (246, 248, 250, 252), and tags the metric information with the instance identifiers of the virtual machine, without installing software on the virtual machines (instances). The DMMS system allows the networked environment to scale at hyperscale by optimizing a message queue-to-cluster ratio 254 of a networked environment of multiple nodes divided into multiple clusters (e.g., 256 replicates 254 where a message queue may be assigned a cluster of nodes, where multiple clusters may be configured to monitor and meter thousands of nodes). The DMMS system allows the networked environment to further scale at hyperscale by optimizing API servers-to-message queues 258 (e.g., 260 replicates 258) of message queues-to-clusters 254 (e.g., replicated by 256) of multiple nodes divided into multiple clusters. For example, in order to scale the virtualization management API servers at hyperscale, a master message queue may be placed between a master virtualization management API server in communications with networked slave virtualization management API servers, so that the master virtualization management API server may control a number of the slave API servers that control a number of nodes via respective message queues up to a number limit of message queues manageable by a virtualization management API server.

Figure 3:
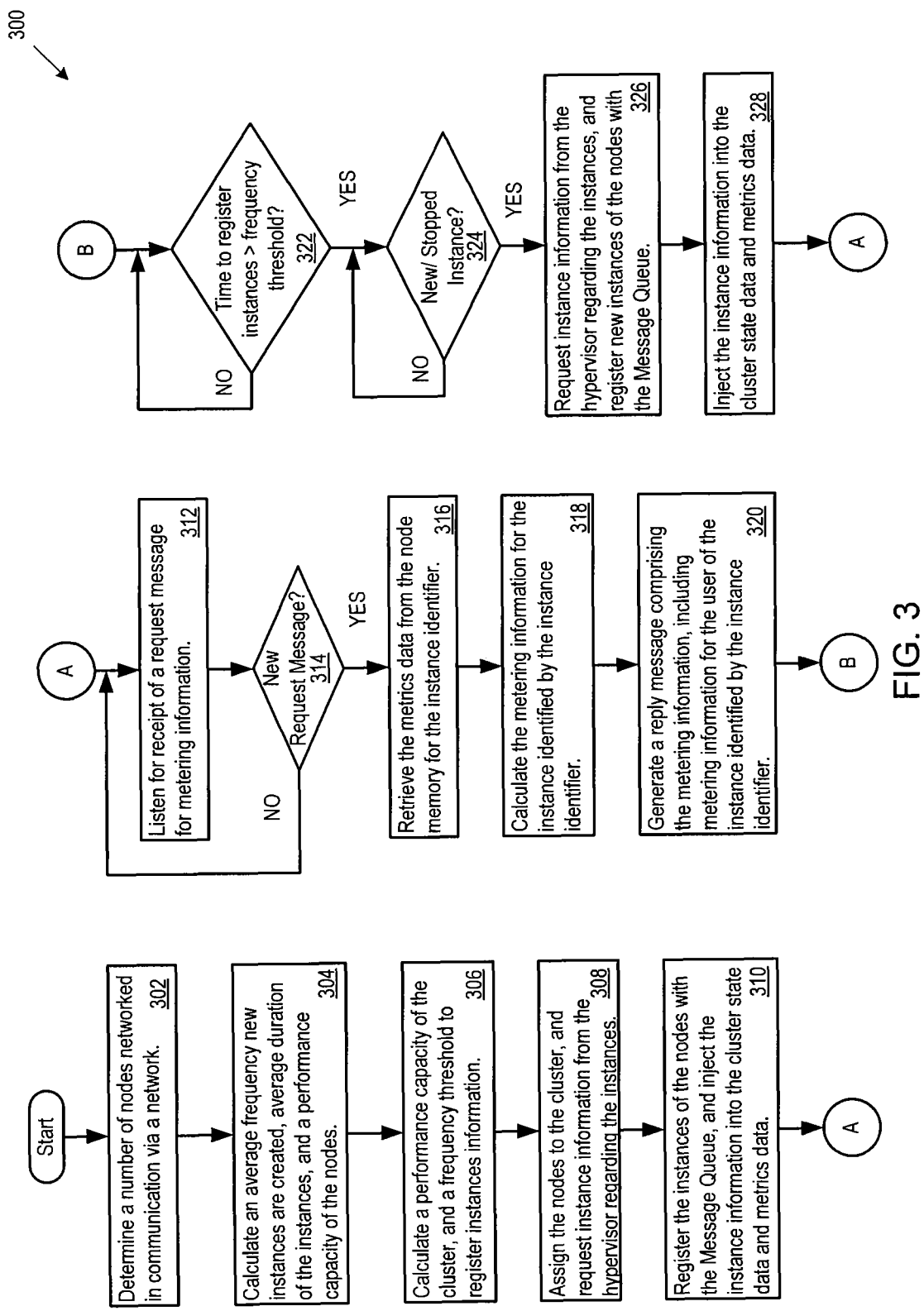
FIG. 3 is logic flow that a DMMS system may use to implement the DMMS.

FIG. 3 is logic flow 300 that a DMMS system may use to implement the DMMS. The DMMS system may determine how many of the nodes are in communication via a network (302) by any number of known ways used to discover network devices connected to a network. The DMMS system may calculate the average frequency that new instances are created, average duration of the instances, and a performance capacity of the nodes, and/or the DMMS system may retrieve such information from each node (304). The DMMS system calculates a performance capacity of the cluster that may indicate a cluster-to-node ratio threshold value, and a frequency threshold within which to register instances information (306), both discussed below. The DMMS system may identify a number of nodes that satisfy the cluster-to-node ratio threshold value, and assign the nodes to the cluster, and request (e.g., using the DMMS monitor) instance information from the hypervisor regarding the instances of the nodes of the cluster (308). The metering logic (e.g., the DMMS monitor) may determine, for each node, the instances assigned to the node using the instance identifier, and may employ libvirt to communicate with the hypervisor to retrieve instance information about the instances assigned to the nodes. The DMMS monitor registers, according to a configurable frequency threshold, the instances of the nodes with the message queue logic by using the instance identifier to create a message queue for each instance, and injects the instance identifiers and/or the respective instance state information into the cluster state data and metrics data (310). The DMMS producer listens for receipt of request messages for metering information (312), and when the request message is received (314) the DMMS monitor retrieves the metrics data the instance identifier(s) from the node memory and/or the metrics data aggregator database for the cluster (316). The DMMS producer and/or the usage log processing and metering synthesis logic may calculate the metering information (318). The DMMS consumer generates a reply message comprising the metering information, including metering information for the user of the instance identified by the instance identifier (320). The DMMS monitor registers, according to a configurable frequency threshold (322), new instances (324) of the nodes with the message queue logic by requesting instance information from the hypervisor regarding the instances, and registering new instances of the nodes with the message queue (326). The DMMS monitor injects the instance identifiers and/or the respective instance state information into the cluster state data and metrics data (328).

Figure 4:
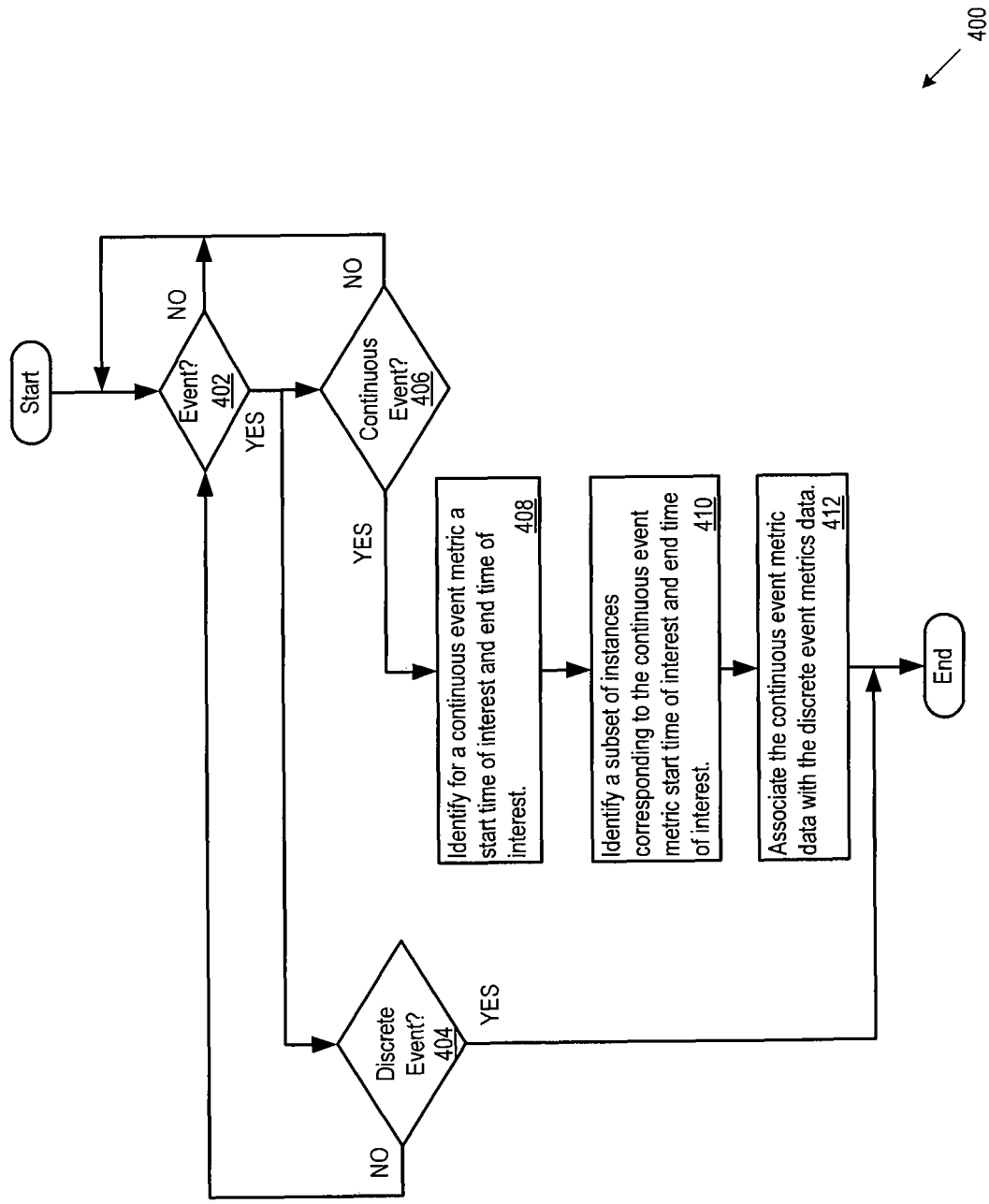
FIG. 4 is logic flow that the DMMS logic may use to associate the continuous event metrics data with discrete event metrics data.

FIG. 4 is logic flow 400 that the DMMS logic may use to associate the continuous event metrics data with discrete event metrics data. The DMMS logic may calculate metering information for each of the users (instances) by evaluating the metrics data to identify events (402), including discrete events (404) and continuous events (406). The discrete events include a start time and stop time, including a number of discrete networked resources consumed by the instances, the state of the clusters, and the state of the nodes. The continuous events may include a state of continuously metered events including connectivity, bandwidth of the network, and compute throughput capacity. The DMMS logic may include usage log processing and metering synthesis logic to calculate the metering information for each of the users (instances) by associating the continuous event metrics data with discrete event metrics data, and querying the message queue for continuous data sets associated with discreet metrics. The DMMS logic may associate the continuous event metrics data with discrete event metrics data by identifying for a continuous event metric a start time of interest and end time of interest (408), identifying a subset of instances corresponding to the continuous event metric start time of interest and end time of interest (410), and querying the message queue for continuous data sets associated with the discreet metrics (412) for the period during the continuous event metric start time of interest and end time of interest.

Figure 5:
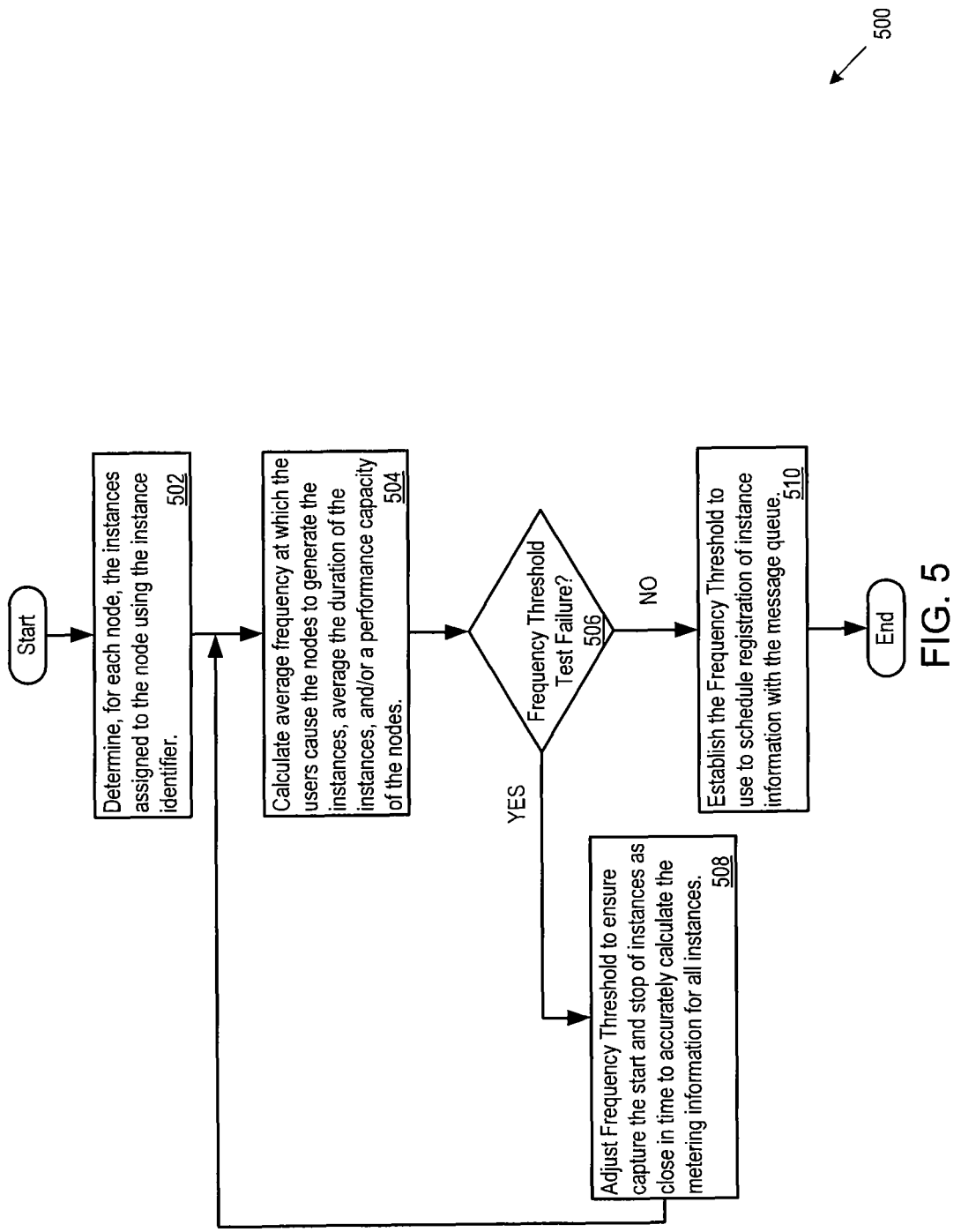
FIG. 5 is logic flow that the DMMS logic may use to calculate a frequency threshold to register instances information.

FIG. 5 is logic flow 500 that the DMMS logic may use to calculate a frequency threshold to register instances information. The metering logic (e.g., the DMMS monitor) determines, for each node, the instances assigned to the node using the instance identifier by requesting instance information from the hypervisor (e.g., via libvrt) (502). The frequency threshold to query the hypervisor in order to timely register instance state information with the messaging queue logic may be calculated based on a calculated average frequency at which the users cause the nodes to generate the instances, the average duration of the instances, and/or a performance capacity of the nodes, or some other factors or any combination of factors (504). The DMMS logic may perform a frequency threshold test by varying the frequency and/or the test parameters for the average duration of the instances, and/or a performance capacity of the nodes, or some other parameters (506) (508). When the frequency threshold satisfies the requirements of the cluster and node, the DMMS system implements the frequency threshold operationally to query the hypervisor in order to timely register instance state information with the messaging queue logic (510).

Figure 6:
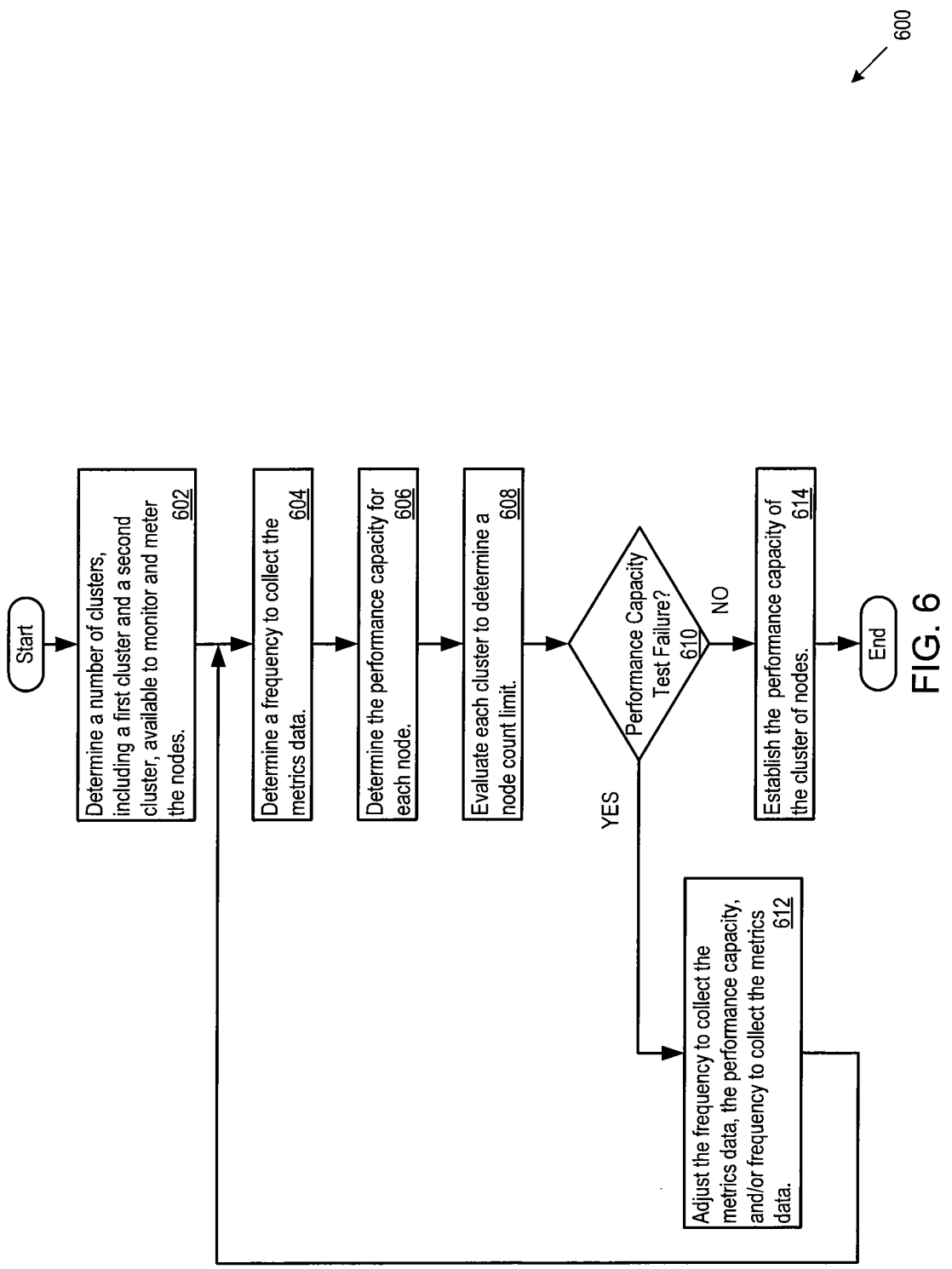
FIG. 6 is logic flow that the DMMS system may use to calculate a performance capacity of a cluster.

FIG. 6 is logic flow 600 that the DMMS system may use to calculate a performance capacity of a cluster. The DMMS system determines the number of nodes available to assign to clusters based on a cluster-to-node ratio threshold. For example, 2500 nodes may be configured to assign 5 sets of 500 nodes each to 5 clusters, although the number of nodes assigned to each cluster does not have to be evenly distributed. The DMMS system may identify any number of permutations of node combinations to define a unique cluster from a plurality of nodes in the networked environment (602). The cluster-to-node ratio threshold may be a calculation based on a performance capacity of the cluster and performance capacity of the metric aggregator logic. The cluster-to-node ratio threshold calculation may indicate the number of nodes to assign to a shared messaging queue from a plurality of shared messaging queues for the nodes of respective clusters. The DMMS system may automatically implement any number of shared message queues for respective clusters of a networked environment based on the cluster-to-node ratio threshold calculation. The DMMS system may calculate the performance capacity of each cluster by determining the number of clusters available to monitor and meter the nodes, determining a frequency to collect the metrics data in order to accurately calculate the DMMS parameters (604) (e.g., see FIG. 4 and example above), determining the performance capacity of the nodes (606), evaluate each cluster to determine the performance capacity for each cluster (608), including a node count limit. The performance capacity may be based on the number of nodes, the metrics data to collect in order to calculate the DMMS parameters, and the frequency to perform the metrics data collection. The DMMS system may perform test to establish the performance capacity of the clusters by testing variable test parameters for the number of nodes, the metrics data to collect in order to calculate the DMMS parameters, and the frequency to perform the metrics data collection (610) (612). The DMMS system successful test of test parameters may establish the cluster-to-node ratio threshold, and indicate the performance capacity of the cluster and/or the performance capacity of the metric aggregator logic (614).

Figure 7:
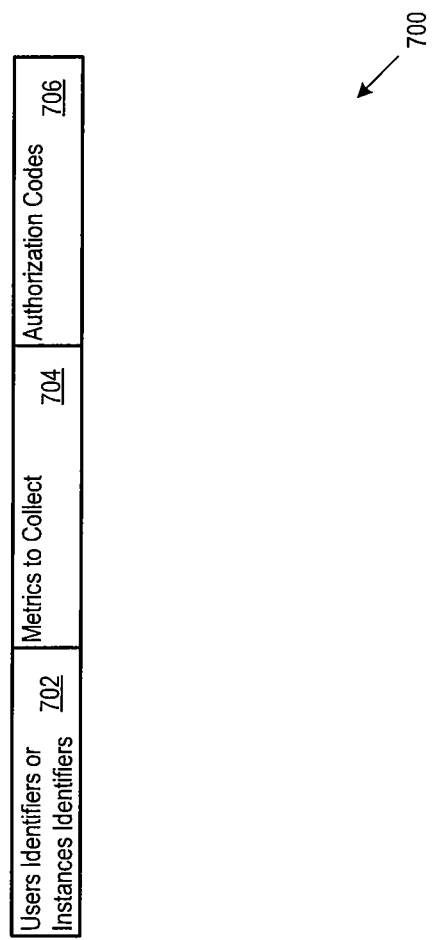
FIG. 7 is a block diagram of a request message with instance identifier.

FIG. 7 is a block diagram 700 of a request message with instance identifier. The request message may include users' identifiers and/or instances' identifiers 702, metrics to collect 704, and authorization codes 706. The authorization codes 706 may indicate an authorization level or policy to use to process a request, information sensitivity, authorization, and security, and/or a priority scheme. The metrics to collect 704 may include metrics data to collect, time frames and frequency of time frames to collect metrics data. The authorization code 706 may be used optionally to test the integrity and security of the DMMS system, for example, after a change release the authorization code 706 may be used in conjunction with the instance identifier information to generate a request message to confirm that the system returns metrics data that the requester is authorized to receive. An implementer may use the authorization code 706 during initial implementation of the DMMS system, and/or during auditing periods. The authorization code may be used as a failover mechanism to increase security during a particular time period of interest, and may be turned on or off and/or used in response to performance considerations. The request message may be configured to include more information and ordered and formatted any number of ways to improve readability, processing, security, and analysis.

Figure 8:
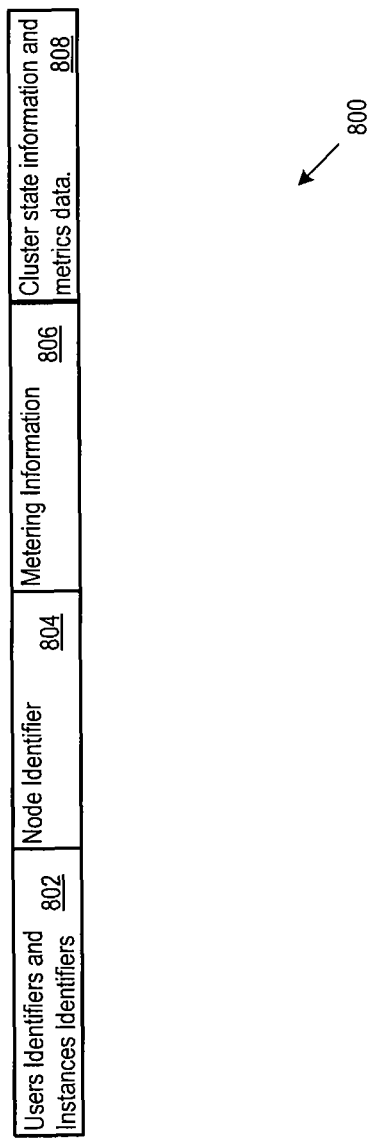
FIG. 8 is a block diagram of a reply message with metering information for a user of an instance.

FIG. 8 is a block diagram 800 of a reply message with metering information for a user of an instance. The reply message may include users' identifiers and/or instances' identifiers 802, a node identifier 804 of the assigned instances, metering information 806, and cluster state information and metrics data 808. The reply message may be configure to include more information and ordered and formatted any number of ways to improve readability, processing, and analysis.

Figure 9:
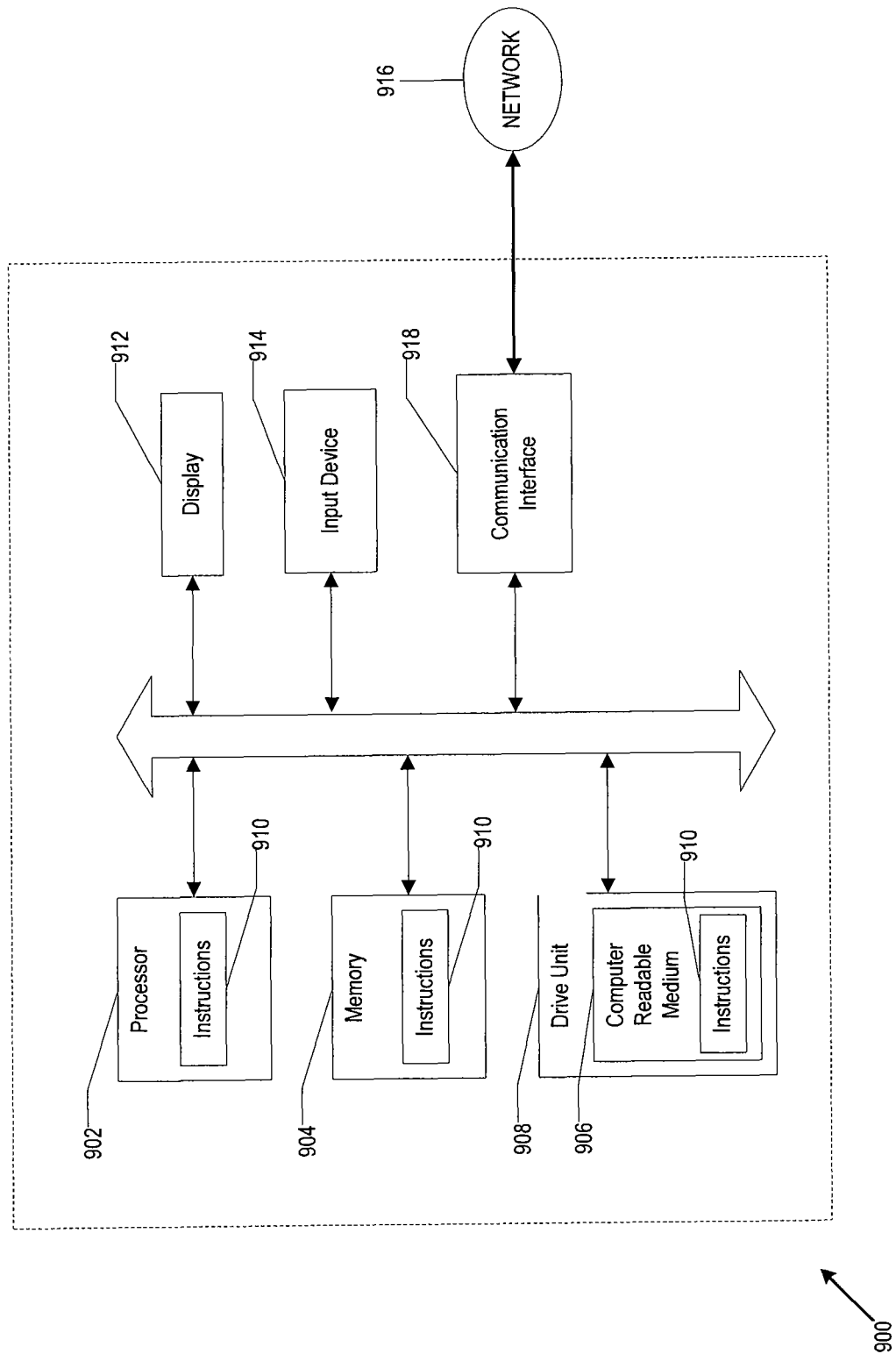
FIG. 9 is a block diagram of a general computer system that may be used in a DMMS system.

FIG. 9 is a block diagram 900 of a general computer system that may be used in a DMMS system configuration 100. In a networked deployment, the computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 902, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may implement a software program, such as code generated manually (i.e., programmed).

The computer system may include a memory 904 that can communicate via a bus. The memory may be a main memory, a static memory, or a dynamic memory. The memory 904 may include, but may not be limited to computer readable storage media 906 such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the system memory, or other memory. The memory may be an external storage device 908 or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions 910 executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The computer system may further include a display 912, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit 908.

Additionally, the computer system may include an input device 914 configured to allow a user to interact with any of the components of system. The input device 914 may be a number pad, a keyboard, or a cursor control device, such as a mouse, or a joystick, touch screen display, remote control or any other device operative to interact with the system.

The computer system may also include a disk or optical drive unit 908. The disk drive unit may include a computer-readable medium in which one or more sets of instructions, e.g. software, can be embedded. Further, the instructions may perform one or more of the methods or logic as described herein. The instructions 910 may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network 916 may communicate voice, video, audio, images or any other data over the network. Further, the instructions may be transmitted or received over the network via a communication interface 918. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A distributed metering and monitoring service (DMMS) system, the DMMS system comprising:
   a first memory coupled to a first processor, wherein the first memory comprises:
      messaging queue logic executable by the first processor that when executed causes the first processor to:
         receive a request message;
         route the request message;
         receive a reply message; and
         route the reply message;
      logic executable by the first processor that when executed causes the first processor to:
         receive a request message comprising DMMS parameters for which to collect metrics data, and calculate metering information;
         determine a number of nodes and node identifiers of the nodes networked in communication via a network, each node comprising:
      instances responsive to respective user interactions through a user interface, including instances for users of the instances, including a first instance for a first user of the first instance;
      collect the metrics data for the nodes, including metrics data for a first node, including the first instance; and
      generate the reply message comprising the metering information, including metering information for the first user of the first instance;
   the nodes of the number of nodes, wherein each of the nodes comprise:
      a second memory coupled to a second processor, wherein the second memory comprises:
         cluster state data and the metrics data for the node identifiers;
         a hypervisor operable to manage the instances, and instance state information stored in the second memory and executed by the second processor, wherein the hypervisor assigns each of the instances, including the first instance, to a node from the number of nodes, including the first node;
         metering logic executable by the second processor that when executed causes the second processor to:
            generate the reply message comprising the metering information for the instances assigned to the nodes;
            inject, for each node, an instance identifier and/or the instance state information into the cluster state data and metrics data; and register, according to a configurable frequency threshold, each of the instances with the messaging queue logic by using the instance identifier to create a message queue for each instance.

2. The system of claim 1,
wherein the hypervisor assigns the instance identifier that identifies the node assigned to each instance by a node id, and wherein the instances consume networked resources in the network; and
wherein the metering logic is further executable by the second processor to retrieve instance state information from the hypervisor for the instances identified by the instance identifier.

3. The system of claim 2, wherein the DMMS system further comprises: a communications interface in communications with a virtual machine controller system, comprising:
a third memory coupled to a third processor, wherein the third memory comprises:
information regarding a link between the instance identifier and user identifiers, including a first user identifier for the first user.

4. The system of claim 2, wherein the metering logic is further operable to cause the second processor to:
determine, for each node, the instances assigned to the node using the instance identifier, including the first instance;
listen for receipt of the request message, and when the request message is received:
retrieve the metrics data from the second memory for the instance identifier;
calculate the metering information, including the metering information for the first instance;
request instance information from the hypervisor regarding the instances.

5. The system of claim 4, wherein the frequency threshold to register each of the instances with the messaging queue logic is calculated based on: a calculated average frequency at which users including the first user cause the nodes to generate the instances; an average the duration of the instances; and a performance capacity of the nodes.

6. The system of claim 4, wherein the metering information, for each instance, comprises:
storage utilization including duration of storage utilization, frequency of access to storage utilized, and size of retrieval and storage requests;
compute utilization including duration of use of networked resources; and
infrastructure utilization including duration of use of an amount of bandwidth of network utilized.

7. The system of claim 4, wherein the request message comprises a request for metering information for the first instance, and when the request message is received the metering logic calculates the metering information by determining first instance metrics data from the metrics data for the first instance.

8. The system of claim 4, wherein the metrics data includes discrete events metrics data and continuous events metrics data that identify discrete events and continuous events, respectively, wherein the metrics data comprises: storage metrics; compute metrics; and infrastructure metrics.

9. The system of claim 8, wherein the instances consume networked resources consumed during discrete events and continuous events that occur in the network responsive to the user interactions through the user interface, and wherein the cluster state data and the metrics data, include data that records the discrete events and the continuous events.

10. The system of claim 1, wherein the DMMS logic stored in memory that calculates the metering information for each of the users, including the first user of the first instance by further causing the first processor to:
identify for a continuous event metric a start time of interest and end time of interest for which to retrieve and/or collect continuous event metrics data.

11. The system of claim 10, wherein the DMMS logic stored in memory that associates the continuous event metrics data with discrete event metrics data, by further causing the first processor to:
identify a subset of instances corresponding to the continuous event metric start time of interest and end time of interest;
query the message queue for continuous data sets associated with discreet metrics.

12. The system of claim 8, further comprising:
metric aggregator logic executable by the second processor that when executed causes the second processor to assign the nodes to clusters,
wherein the discrete events comprise: a start time and stop time, including a number of networked resources consumed by the instances, a state of the clusters, and state of the nodes.

13. The system of claim 8, wherein the continuous events comprise: a state of continuously available including connectivity, bandwidth of the network, and compute throughput capacity.

14. The system of claim 1, wherein the request message comprises a request for time-series metrics data or metering data for instances.

15. The system of claim 1, wherein the cluster state data and metrics data comprises time-series metrics.

16. The system of claim 2, wherein the instances for each of the nodes are virtual machines managed by the hypervisor of each of the nodes respectively.

17. The system of claim 2, wherein the instance identifier of each node is a routing identifier used by the message queue logic.

18. The system of claim 1, wherein the DMMS logic stored in a memory that further causes the first processor to: determine a subset of the metrics data to collect in order to calculate the DMMS parameters.

19. The system of claim 1, wherein each of the instances identifies a user for whom the metering logic calculates the metering information.

20. The system of claim 2, wherein the metering logic employs libvirt to communicate with the hypervisor of each of the nodes to retrieve instance information about the instances assigned to the nodes.

21. A distributed metering and monitoring service (DMMS) system, the DMMS system comprising:
a first memory coupled to a first processor, wherein the first memory comprises:
messaging queue logic executable by the first processor that when executed causes the first processor to:
receive a request message;
route the request message;
receive a reply message; and
route the reply message;
logic executable by the first processor that when executed causes the first processor to:
receive a request message comprising DMMS parameters for which to collect metrics data, and calculate metering information;
determine a number of nodes and node identifiers of nodes networked in communication via a network, each node comprising: instances responsive to respective user interactions through a user interface, including instances for users of the instances, including a first instance for a first user of the first instance;

collect the metrics data for the nodes, including metrics data for a first node and the first instance; and generate the reply message comprising the metering information, including metering information for the first user of the first instance;

the nodes of the number of nodes, wherein each of the nodes comprise:

a second memory coupled to second processor, wherein the second memory comprises:

cluster state data and the metrics data for the node identifiers;

a hypervisor operable to manage the instances, and instance state information stored in the second memory and executed by the second processor, wherein the hypervisor assigns an instance identifier that identifies a node from the number of nodes as an assigned node identified by a node identifier;

metering logic executable by the second processor that when executed causes the second processor to:

retrieve, using the instance identifier for each of the instances from the hypervisor for the instances, the metrics data; and generate the reply message comprising the metering information for the instances assigned the assigned nodes;

wherein the messaging queue logic comprises a cluster-to-cluster ratio threshold calculation that is based on a performance capacity of clusters including a first cluster.

22. The system of claim 21, wherein the DMMS parameters identify the users of the instances, including the user of the first instance, and wherein the metering information is calculated for each of the users by using the instance identifier for each of the instances linked to the metrics data of the nodes by the metering logic to identify a subset of metrics data collected by the metric aggregator logic to retrieve.

23. The system of claim 21, further comprising logic stored in memory, wherein the performance capacity of the clusters including the first cluster and a second cluster is calculated when the logic further causes the first processor to:

determine a number of clusters, including the first cluster and the second cluster, available to network with the nodes;

determine a frequency to collect the metrics data in order to accurately calculate the DMMS parameters;

evaluate each cluster to determine the performance capacity for each of clusters, including:

a node count limit, wherein the performance capacity is based on the number of nodes, the metrics data to collect in order to calculate the DMMS parameters, and the frequency to perform the metrics data collection.

24. The system of claim 21, wherein the metric aggregator logic stored in memory that monitors the nodes of a cluster and collects node level information.

25. The system of claim 21, wherein the cluster-to-node ratio threshold calculation indicates the number of nodes to assign to a shared messaging queue from a plurality of shared messaging queues for the nodes of respective clusters.

26. A distributed metering and monitoring service (DMMS) system, the DMMS system comprising:

a memory coupled to a processor, wherein the memory comprises:

a hypervisor that is operable to:

manage instances, and instance state information stored in the memory and executed by the processor, wherein the hypervisor assigns each of the instances, including a first instance, to a node from a number of nodes, including a first node; metric aggregator logic;

metering logic operable to cause the processor to:

determine the number of nodes networked in communication via a network, each node comprising: the instances responsive to respective user interactions through a user interface, wherein the instances include instances for users of the instances, including the first instance for a first user of the first instance;

determine a number of clusters by assigning the nodes to respective clusters including a first cluster, including a first subset of the nodes including the first node comprising the first instance assigned to the first cluster, wherein each cluster defines node identifiers for each of the nodes assigned to the respective clusters wherein the metric aggregator logic when executed causes the processor to assign the nodes to the respective clusters including the first cluster;

determine a configurable frequency threshold that is calculated by using a probable frequency and a performance capacity;

determine, for each node, the instances of the node; and register, based on the determined configurable frequency threshold, each of the instances with a respective messaging queue in communication with the respective clusters comprising messaging queue logic.

27. A distributed metering and monitoring service (DMMS) system, the DMMS system comprising:

a memory coupled to a processor, wherein the memory comprises:

a hypervisor that is operable to: manage instances, and instance state information stored in the memory and executed by the processor;

metering logic operable to cause the processor to:

determine, by the processor, a number of nodes networked in communication via a network, each of the number of nodes comprising: the instances responsive to respective user interactions through a user interface;

determine, by the processor, a number of clusters to use to assign the nodes to respective clusters;

determine, by the processor, the instances of the node of the number of nodes; and determine, by the processor, a configurable registration frequency threshold to use to register each of the instances of the node of the number of nodes with a respective messaging queue in communication with the cluster comprising messaging queue logic, wherein the registration frequency threshold is calculated based on a model of the nodes that identifies:

a probable frequency at which users cause the nodes to generate the instances; and a performance capacity wherein each of the clusters is in communications with a respective messaging queue.

28. A method for a distributed metering and monitoring service (DMMS) system having a first memory coupled to a first processor, the method comprising:

receiving, into the first memory by executing messaging queue logic by the first processor, a request message;

routing, from the first memory by executing the messaging queue logic by the first processor, the request message;
receiving, from the first memory by executing the messaging queue logic by the first processor, a reply message;
routing, into the first memory by executing the messaging queue logic by the first processor, the reply message;
receiving, by executing the first processor, a request message comprising DMMS parameters for which to collect metrics data, and calculate metering information;
determining, by executing the first processor, a number of nodes and node identifiers of nodes networked in communication via a network,
  wherein each node comprises: instances responsive to respective user interactions through a user interface, including instances for users of the instances, including a first instance for a first user of the first instance,
  wherein each of the nodes of the number of nodes comprises:
    a second memory coupled to a second processor, wherein the second memory comprises:
      cluster state data and the metrics data for the node identifiers;
      a hypervisor operable to manage the instances, and instance state information stored in the second memory and executed by the second processor, wherein the hypervisor assigns each of the instances, including the first instance, to a node from the number of nodes, including the first node;
      metering logic executable by the second processor that when executed causes the second processor to:
        generate the reply message comprising the metering information for the instances assigned to the nodes;
        inject, for each node, an instance identifier and/or the instance state information into the cluster state data and metrics data; and
        register, according to a configurable frequency threshold, each of the instances with the messaging queue logic by using the instance identifier of each node to create a message queue for each instance;
collecting, by executing the first processor, the metrics data for the nodes, including metrics data for a first node and the first instance; and
generating, by executing the first processor, the reply message comprising the metering information, including metering information for the first user of the first instance.

29. A method for a distributed metering and monitoring service (DMMS) system having a first memory coupled to a first processor, the method comprising:
receiving, into the first memory by executing messaging queue logic by the first processor, a request message;
routing, from the first memory by executing the messaging queue logic by the first processor, the request message;
receiving, from the first memory by executing the messaging queue logic by the first processor, a reply message;
routing, into the first memory by executing the messaging queue logic by the first processor, the reply message;
receiving, by executing the first processor, a request message comprising DMMS parameters for which to collect metrics data, and calculate metering information;
determining, by executing the first processor, a number of nodes and node identifiers of nodes networked in communication via a network,
  wherein each node comprises: instances responsive to respective user interactions through a user interface, including instances for users of the instances, including a first instance for a first user of the first instance,
  wherein each of the nodes of the number of nodes comprises:
    a second memory coupled to second processor, wherein the second memory comprises:
      cluster state data and the metrics data for the node identifiers,
      a hypervisor operable to manage the instances, and instance state information stored in the second memory and executed by the second processor, wherein the hypervisor assigns an instance identifier that identifies a node from the number of nodes as an assigned node identified by a node identifier,
      metering logic executable by the second processor that when executed causes the second processor to:
        retrieve, using the instance identifier for each of the instances from the hypervisor for the instances, the metrics data, and
        generate the reply message comprising the metering information for the instances assigned the assigned nodes;
collecting, by executing the first processor, the metrics data for the nodes, including metrics data for a first node and the first instance; and
generating, by executing the first processor, the reply message comprising the metering information, including metering information for the first user of the first instance.

* * * * *